United States Patent Office 3,171,365
Patented Mar. 2, 1965

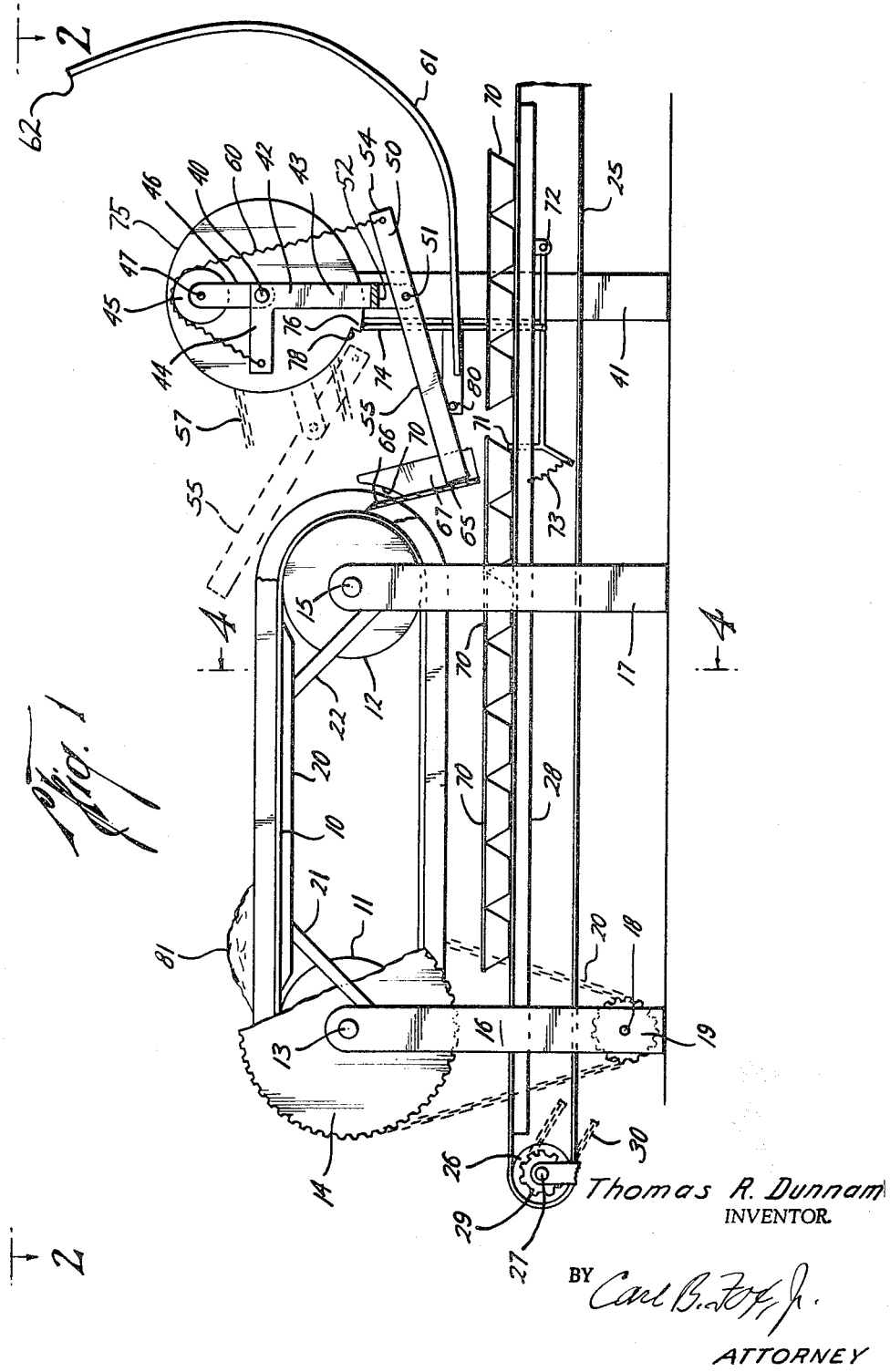

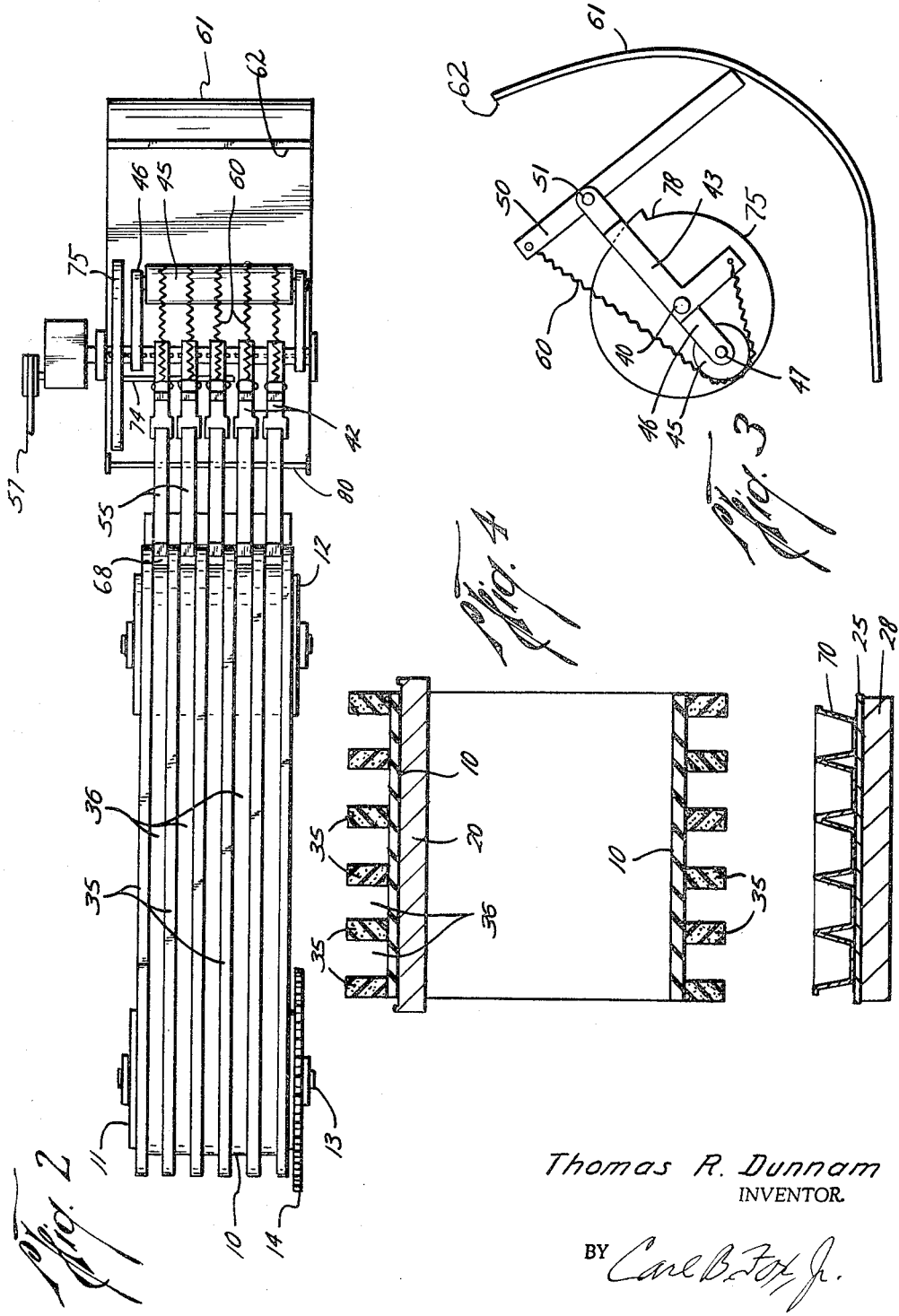

3,171,365
BAKERY APPARATUS
Thomas R. Dunnam, Houston, Tex., assignor to Carver Foods Company, Houston, Tex., a corporation of Texas
Filed May 27, 1963, Ser. No. 283,233
6 Claims. (Cl. 107—7)

This invention pertains to the handling of dough, and more particularly to the depositing of dough in multiple cake plans for the manufacture of multiple individual cakes.

A principal object of the invention is to provide apparatus for expeditious handling and depositing of dough, primarily cake dough, in multiple individual cake form.

Another object of the invention is to provide such apparatus which are substantially continuous in operation.

Still another object of the invention is to provide such apparatus which are of relatively simple operation and are dependable in operation.

Briefly, the invention contemplates providing a mass or masses of dough travelling along a conveyor in a trough or troughs, at constant speed, and an assembly for scraping or cutting off and directing from the mass individual cake-sized lumps of dough into individual pans for baking, on a substantially continuous basis. The dough is premixed in other means and delivered into the troughs of the conveyor. Among the objects of the invention are that the dough, once delivered to the conveyor, is thereafter handled and measured automatically and continuously, with reliable and consistent measurement and delivery of the individual lumps of dough into the separate compartments of multiple-compartment cake pans, with avoidance of sticking of the dough throughout the operation, and without gumming and clogging of the apparatus.

Other objects and advantages of the invention will appear from the following detailed description of one embodiment, of preferred form, of the invention, reference being made to the accompanying drawings, of which:

FIGURE 1 is a side elevational view, partly in cross section, of a preferred embodiment of apparatus according to the invention, the drawing being schematic in part;

FIGURE 2 is a plan view of the apparatus shown in FIGURE 1, taken at line 2—2 of FIGURE 1;

FIGURE 3 is a partial elevational view of the same apparatus, showing the apparatus of the right-hand portion of FIGURE 1 in a moved position; and FIGURE 4 is a partial vertical cross sectional view taken as indicated by line 4—4 of FIGURE 1.

The method according to the invention is also illustrated by the apparatus shown in the drawings.

Referring now first to FIGURE 1 of the drawings, an endless loop belt 10 is supported around spaced cylindrical rollers 11, 12. Roller 11 is carried on axial shaft 13, there being a drive gear 14 also carried on the shaft. Roller 12 is similarly carried on an axial shaft 15. Shafts 13, 15 are supported by frame members 16, 17, respectively, forming parts of a complete frame for support of the apparatus not completely shown in the drawings. The frame may take any suitable form known in the art for proper support of the apparatus elements.

Shafts 13, 15 are rotatively mounted, usually journaled in appropriate bearings (not shown), for efficient rotation.

Shaft 18 is rotated by a suitable drive (not shown), such as an engine or motor of any suitable form, and carries a gear 19 rotative therewith. Drive chain 20 engages gears 14, 19 so that roller 11 is driven in a clockwise direction, roller 12 also being rotated through belt 10. Roller 12 may also be similarly driven if desirable.

A rigid flat bed 20 suported by frame members 21, 22 supports the upper run of belt 10 between rollers 11, 12.

An endless loop belt 25 is supported around roller 26 carried on shaft 27 suitably rotatably supported by the frame, only one end portion of the belt being shown. The other end of the belt is also suitably supported, for loopwise belt movement in the customary manner. The upper run of belt 25 is supported by rigid flat bed 28 between the belt supports. Shaft 27 carries gear 29, a drive chain 30 engaging gear 29 and a gear (not shown) on shaft 18 for clockwise rotative movement of roller 26, belt 25 being moved correspondingly.

Belt 10 (see also FIGURES 2 and 3) has a plurality of spaced groove or trough separators 35 longitudinally therealong. The belt is constructed of rubber or plastic or other flexible or elastomeric material. Separators 35 are in the form of projecting ribs, forming a plurality of spaced parallel gutters or troughs 36 around the length of the belt. The separators may be constructed of plain or preferably foam rubber or plastic, cemented or bonded to the belt, or otherwise suitably affixed thereto. Because the separators must stretch somewhat in curving around the rollers, the material preferably is at least elastic enough to permit the necessary stretching without undue lateral and other distortions.

Referring now especially to FIGURES 1, 2 and 3 of the drawings, a shaft 40 is rotatively supported by frame members 41 (one being shown). A plurality of members 42 are keyed to the shaft for rotation therewith, there being a member 42 opposite to and in alignment with each trough 36 of belt 10. Each member 42 is L-shaped and consists of a straight bar portion 43 having an opening to receive shaft 40, and a shorter right-angle bar portion 44 depending therefrom adjacent the shaft opening. A roller 45 offset from and parallel to shaft 40 is supported by a bar 46 keyed to each end of the shaft at a shaft opening near one end and having an opening 47 near the opposite end to receive the shaft of roller 45.

The end of each bar portion 43 of each member 42 is slotted forming a Y-shaped yoke. A bar 50 is pivotally mounted in each yoke by a pin 51, the bottom 52 of each yoke limiting the pivotal motion of each bar 50, so that the shorter end portion 54 of the bar can pivot counterclockwise only to a position a fixed distance from shaft 40 and the other longer end portion 55 can be extended only to a maximum fixed distance from shaft 40. This extended position of bar 50 is shown by the dashed line position of bar 50 in FIGURE 1.

Shaft 40 and elements 42, 46 are driven in counterclockwise rotation about the axis of shaft 40. A driver chain 57 engages a gear (not shown) keyed to a countershaft driving shaft 40, the drive chain being connected to a suitable drive assembly, for example to a gear mounted on drive shaft 18.

A helical tension spring 60 is connected to the outer end of each bar portion 44, the springs extending around the outer side of roller 45 with the opposite ends each connected to the corresponding bar 50 at its end 54. Thus, the bars 50 are each biased to the dashed line position shown in FIGURE 1, previously described.

A curved plate 61 is supported by frame 41 below and to the right of the assembly of shaft 40 as shown in the drawings. The curvature and position of plate 61 is such that, as shaft 40 and bars 50 rotate counterclockwise, the ends 55 of bars 50 will be depressed extending springs 60 with the depression evenly decreasing to zero as the bar ends 55 move to edge 62 of plate 61. The bar 50 movements will be more fully described later in the description.

A plate 65 slanting downwardly away from the end of belt 10 has a relief 66 for passage of each web 35 and a depending web 67 corresponding with each web 35 to provide a channel 68 corresponding to and extending from each trough 36 of belt 10. Webs 67 are formed at ends 70 to be closely spaced from the edges of webs 35, as best shown in FIGURE 1. Plate 65 extends from just above the surface of belt 10 to just above the cake pans.

Cake pans 70 are of a common form, each having an upper plate having individual cake receptacles fixed in openings therethrough, side-by-side in rows. The form and construction of the pans does not form a part of the invention, it being only necessary to use pans of the described form or of another suitable form in connection with practice of the invention. The pans are fed onto belt 25 at the roller 26 end thereof, in series. Each pan moves with the belt until it is stopped by contact with a stop 71, which contacts a lower part of the pan at each crosswise row of cake receptacles thereof, or by a pan ahead of it on the belt. Belt 25 is actually two side-by-side belts, with a slot-like space therebetween through which stop 71 projects. Stop 71 is pivotally attached to bed 28 at bracket 72 and is biased upwardly through an opening in bed 28 by a spring 73. Stop 71 has an L-shaped laterally and upwardly extending rod portion 74 extending around a side of the pans and belt to contact at its upper end with a cam 75 which rotates counterclockwise with shaft 40. The cam permits the stop to remain in an elevated pan stopping position until raised portion 76 of the cam contacts rod 74 at which time the stop is depressed against the spring pressure to permit movement of the pan. When part 78 of the cam engages the rod the stop moves upwardly to stop the pans at the next row of cake receptacles.

A wire 80 extends tautly over the pans between the lower ends of plate 61 and plate 65.

Operation of the apparatus will now be described. A quantity of dough 81 is placed on top of belt 10 and pressed down to completely fill the troughs 36 of the belt at least before the dough is carried over roller 12. This is usually done by hand, although a mechanical dough feeder may be employed if available. Because of the sticky nature of the dough and because the dough may contain constituents such as fruit, or the like, which may be damaged, hand feeding is considered best. Hand implements may be employed, but even these, like mechanical feeders, are not overly satisfactory because of faulty feeding because of gumming and because of possible damage to the dough.

As the upper run of belt 10 moves toward the right the dough in the troughs is carried to beneath the dashed-line position of the bars 50 (FIGURE 1). The bars 50 move down against the dough in each trough each carrying ahead of it the proper amount of dough for one cake. As the bars 50 move on around, their outer ends scrape down over belt 10 carrying the dough ahead of them, the dough sticking to the underside of the bar ends. When the bar ends are moved around far enough that they are not held depressed by contact with belt 10, the springs 60 cause the bars to move rapidly downwardly until they strike wire 80. This movement of the bars throws the portions of dough downwardly toward the row of cake receptacles therebeneath, and when the bars strike wire 80 the dough is thrust from the bars and plunked into the cake receptacles, each receptacle there being filled with a proper amount of dough. Further movement of the bars 50 counterclockwise around shaft 40 causes the bar ends to drag over wire 80, thus scraping them clean of dough, and the bars then continuing their travel move around against plate 61 to be in extended position ready for removing the succeeding portions of dough from troughs 36 to fill the next crosswise row of cake receptacles, belt 10 having continued its movement to bring additional dough portions to proper positions and stop 71 having released the pans to permit belt 25 to move up the next row of cake receptacles.

The speeds of rotation and movement of the several elements, must, of course, be such as to provide proper consistent operation. Belt 10 must move a proper speed to move proper portions of dough beneath bars 50 for each cyclical movement of the bars. Belt 25 must move to advance the pans one row for each cycle of bars 50. Bars 50 must move around once for each row of dough portions delivered. The amount of dough delivered may, of course, be adjusted by changing the speed of belt 10. All of these speeds may be as selected within practical mechanical limits of the equipment. The drives for each rotative element may be separate, and each may, whether separate or not, contain a variable speed control as a component of the drive assembly, all of which is well within the skill of the art.

The apparatus may have any selected number of bars 50, from only one to any number for which properly operating equipment can be designed. By modification as will be perceived by one skilled in the art, pans 70 may be disposed side-by-side as well as end-to-end in apparatus having bars 50 in numbers greater than the number of cake receptacles across one pan.

The invention has been found to be especially useful for handling fruitcake dough, which is especially gummy and sticky, and contains fruits subject to mashing, and which consequently is very difficult to handle.

While preferred embodiments of apparatus have been described, many modifications thereof may be made by a person skilled in the art without departing from the spirit of the invention, and it is intended to protect by Letters Patent all forms of the invention falling within the scope of the following claims:

1. Apparatus for depositing portions of dough, comprising conveyor means for delivering a continuous ribbon of dough, spring biased pivotal arm means movable across said ribbon of dough for scraping off a portion thereof, means for delivering a dough receptacle to adjacent said arm means prior to said scraping off of said dough portion whereby said arm means scrapes off said dough portion and said spring bias of said arm means propels said dough portion into said receptacle.

2. Apparatus for depositing portions of dough, comprising conveyor means for delivering continuous ribbons of dough, spring biased pivotal arms means movable across each said ribbon of dough for scraping off a portion of dough, means for delivering plural dough receptacles to adjacent said arm means prior to said scraping off of said dough portions whereby said arm means scrapes off each said dough portion and said spring bias of said arm means propels each said dough portion into one of said receptacles.

3. Apparatus for depositing portions of dough in dough receptacles of pans, comprising conveyor means for continuously delivering plural parallel streams of dough, scraper means including plural arm means each cyclically movable to scrape off a portion of dough from the end of one said streams of dough on said conveyor means, means for abruptly stopping said scraping off movement of said arm means above said receptacles, means for positioning a dough receptacle of a multiple receptacle pan substantially below each said arm means coincident with each said cyclic scraping off movement of said arm means whereby each said arm means propels a said portion of dough toward said receptacle upon each said cyclic scaping off movement of said arm means and whereby each said dough portion is plunked clean from each said arm means into said receptacle.

4. Apparatus according to claim 3, wherein said arm means are each flexibly biased toward said streams of dough during said scraping off arm movements whereby when scraping off of a dough portion by one of said arm means is completed said flexible bias accelerates said one of said arm means toward said stop means and toward said receptacle.

5. Apparatus according to claim 4, wherein said arm means are rotatively disposed whereby said arm means rotate circularly to perform a scraping off operation during each rotation, said receptacle positioning means comprising conveyor means and stop means for stopping movement of said pans on said conveyor means to position a row of receptacles of a pan upon each rotation of said arm means.

6. Apparatus according to claim 5, wherein said pan stop means comprises a cam controlled stop, wherein said dough conveyor means comprises elastomeric belt means having spaced elastomeric divider means separating said plural parallel streams of dough, and wherein said arm stop means comprises a taut wire disposed across the path of movement of said arm means between said dough conveyor and said pans.

References Cited by the Examiner

UNITED STATES PATENTS 2,454,316  11/48  Haecks _____ 107—7.2

FOREIGN PATENTS 198,707  7/58  Austria.

ROBERT E. PULFREY, *Primary Examiner.*
CHARLES WILLMUTH, *Examiner.*